United States Patent [19]

Williams

[11] 3,981,203

[45] Sept. 21, 1976

[54] DOOR OPERATOR

[75] Inventor: Gardner R. Williams, Kensington, Conn.

[73] Assignee: The Stanley Works, New Britain, Conn.

[22] Filed: Oct. 24, 1974

[21] Appl. No.: 517,734

[52] U.S. Cl. .................................... 74/25; 49/28; 49/362
[51] Int. Cl.² ...................................... F16H 21/50
[58] Field of Search ................. 74/25; 49/362, 28; 267/155, 156

[56] References Cited
UNITED STATES PATENTS

| | | | |
|---|---|---|---|
| 2,841,018 | 7/1958 | Dickson | 74/25 |
| 2,883,182 | 4/1959 | Bornemann | 49/28 |
| 2,951,390 | 9/1960 | Martens et al. | 49/362 |
| 3,608,612 | 9/1971 | Demberton | 49/362 |
| R27,711 | 7/1973 | Steibel | 74/25 |

Primary Examiner—Samuel Scott
Assistant Examiner—Wesley S. Ratliff, Jr.
Attorney, Agent, or Firm—Prutzman, Hayes, Kalb & Chilton

[57] ABSTRACT

A door operator includes a threadless drive shaft, a carriage mounting skewed rollers engaging the drive shaft to move the carriage along the shaft upon shaft rotation, a drive motor having a shaft coaxial with the threadless shaft and a helical coupling connecting the shafts together. The coupling comprising a plurality of closely spaced helical convolutions with the end of the coupling secured to the motor shaft and the drive shaft, respectively. The coupling includes means for decreasing the shear stresses imposed on the end portions of the convolutions.

3 Claims, 3 Drawing Figures

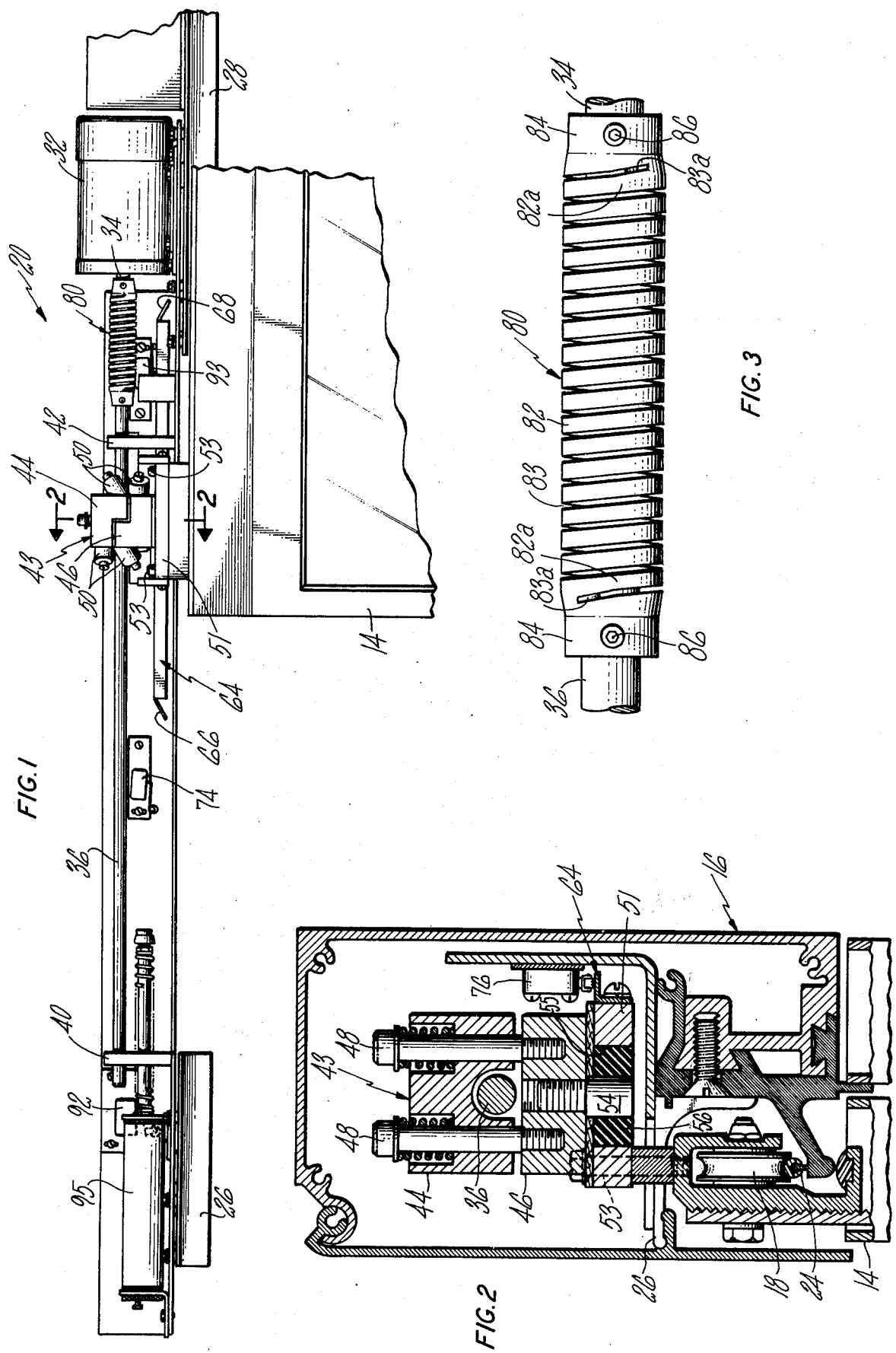

DOOR OPERATOR

This invention relates generally to a door operator and more particularly to an improved highly responsive, low stress electric motor drive door operator suitable for powering sliding doors and the like.

An object of the present invention is to provide an improved door operator which utilizes a drive motor coaxially aligned with and coupled to rotate an elongated cylindrical drive shaft. Included in this object is the provision of an improved coupling which will accommodate angular and offset misalignment between the axes of the motor and the shaft and which is capable of transmitting the torque necessary to overcome the inertia of the door during the initial rapid acceleration thereof while at the same time serving to cushion the shock as required for quietness of operation.

Another object of this invention is to provide a door operator of the type described including a coupling which serves as an electrical and a mechanical shock absorber for the operator.

Still another object of this invention is to provide a simplified door operator having a drive coupling between a sliding door and its drive motor which cushions high impact forces imposed on the operator through axial and torsional spring energy absorption.

Other objects will be in part obvious and in part pointed out more in detail hereinafter.

A better understanding of the invention will be obtained from the following detailed description and the accompanying drawings of an illustrative application of the invention.

In the drawings:

FIG. 1 is a front view of a sliding door assembly including the improved door operator of the present invention;

FIG. 2 is an enlarged cross-sectional view taken along line 2—2 of FIG. 1; and

FIG. 3 is a further enlarged side elevational view of the coupling element utilized in the present invention.

Referring now to the drawings in detail wherein like reference numerals indicate like parts throughout the several figures, there is shown in FIG. 1 a power operated door comprising a sliding door panel 14 depending from a header assembly 16 for reciprocable sliding movement. The header assembly 16 houses the door operator 20 of this invention which may be actuated by any suitable switching mechanism such as a mat switch, not shown, on opposite sides of the doorway.

The sliding door panel 14 is adjustably suspended by a trolley 18 for reciprocable movement along the elongated track 24 on which it is carried to open and closed door positions.

The track 24 may be of any suitable construction such as that disclosed in U.S. Pat. No. 3,473,266 of Robert A. Miller dated Oct. 21, 1969 and entitled "Integrated Header".

The door operator 29 is shown as being mounted on base plates 26, 28 which are mounted by the header 16. Mounted on base plate 28 is a reversible electric motor 32 having its shaft 34 coupled to a coaxially aligned steel cylindrical drive shaft 36. Shaft 36 is journaled for rotation and limited axial movement by a pair of pillow blocks 40, 42 secured to the base plates 26, 28 respectively.

Mounted by the drive shaft 36 is a carriage 43 comprising an upper section 44 and a complementary lower section 46 which are configured to permit the drive shaft 36 to pass between them. The upper and lower sections 44, 46 of the carriage are provided with a plurality of steel rollers 50 which frictionally engage the cylindrical drive shaft 36 and are canted or skewed at an angle with respect to the drive shaft axis to follow, upon rotation of the shaft, a helical path along the shaft. Two spring-loaded bolts 48 bias the upper and lower sections 44, 46 of the carriage together so that the rollers follow a path having a helix angle of about 30° with essentially no slippage.

Secured to the underside of the carriage 43 is a carrier 51 which drivably connects the trolley 18 to the carriage 43 for connecting panel 14 to the carriage 43.

As shown, the carrier 51 is rigidly connected to trolley 18 by a pair of bolts 53. An elastic rubber grommet 56 is provided in the aperture 55 of carrier 51 to accommodate any lateral misalignment between the track 24 and the drive shaft 36. A vertical drive pin 54 is slidably received in the aperture of grommet 56 to accommodate any vertical misalignment between track 24 and shaft 36.

The carrier 51 also serves to mount the control cam for actuating switches for controlling the reciprocable movement of the door panel 14. As shown, a one-piece cam 64 is mounted by the carrier 51 so that the ramp end 66 thereof is positioned to actuate a damping switch 74 as the door approaches its door open position. Similarly, the ramp end 68 is positioned to operate a similar damping switch 76 for slowing down the motor as the door approaches its closed position. The ramp ends 66, 68 further serve to actuate door open switch 92 and a similar door closed switch 93 which operate through suitable electric circuit control means to dynamically brake and terminate the movement of the door at its open and closed positions respectively. As shown, a checking cylinder 95 is provided to assist the dynamic braking of the motor at its open position.

A unique drive coupling is provided for connecting the motor 32 and the shaft 36. As best shown in FIG. 3, the coupling 80 comprises a cylinder formed of spring steel with a mid-portion which is machined to form a spiral spring portion 82 and terminates at each end in solid cylindrical end portions 84 which are rigidly connected to motor shaft 34 and drive shaft 36 respectively by fastening means such as set screws 86. The non-slotted solid end portions 84 are swaged to provide them with a smaller internal diameter than the slotted intermediate portion 80 of the coupling to provide a clearance with shafts 34, 36. Since the shaft 36 is supported radially by the pair of pillow blocks 40, 42 and the motor is independently supported on the mount 28, it is apparent that the design will accommodate an angular misalignment of the shafts 34, 36 or an offset of their axes, while transmitting torque therebetween.

Due to the high inertia of the door, the loading on the coupling builds up so quickly when the motor is energized as to result in an almost instantaneous maximum load on the coupling. The coupling must have a stiffness which results from a spring rate in compression sufficient so that the convolutions of the coupling does not bottom during the initial acceleration. Otherwise, a sharp increase in torque could occur to impose severe stresses on the door and the operator as well as to stress the coupling beyond its elastic limit. A typical single door will weigh about 90–150 lbs. To meet the commercial requirements for a door operator, it should be suitable for the operation of a pair of bi-parting doors as well as single doors. Moreover, it should be capable of opening the door in 1½ to 2 seconds and of being mounted within the limited space available in the door header.

While it is essential that the spring rate of the coupling 80 be sufficient to prevent the bottoming of the convolutions of the coupling during initial acceleration, it is also essential that the operator meet the commercial requirements of fast response and quietness. This requires that the mechanical shock imposed on the operator, particularly at the instant the door is energized be limited. Accordingly, the operator of this invention incorporates a coupling having a significant amount of torsional resilience in addition to compressive resilience to produce the essential cushioning, or shock absorbing effect. The coupling thus functions in a manner similar to that of two compression springs in series with each other with the total spring rate of the combination resulting from a major contribution due to compression and a major contribution due to torsion of the convolutions of the coupling to produce the desired cushioning effect required for a fast response door operator combined with a compressive stiffness sufficient to prevent the convolutions of the coupling from bottoming as the inertia of the stationary door is being overcome during its initial acceleration.

For such an application, a coupling having helical convolutions with a ⅞ inch outer diameter, 17 active convolutions of square cross-section formed with a helix angle of 30° and having a dimension of 0.140 inch on a side spaced from each other by a clearance of 0.060 inch (total maximum axial compression of 0.700 inches) has been used satisfactorily. Such a coupling will also provide for relative rotation of the motor shaft 34 relative to the drive shaft 36 due to its torsional spring rate of about 145 in. lbs. per full turn of the unslotted end 84 of the coupling relative to each other. Such a spring rate will result in a torsional deflection of 62° at 25 in. lbs. of torque. Since the torsional deflection of the coupling will permit the motor shaft to begin to rotate instantaneously upon the application of full voltage to the motor, the torsional deflection provides an instantaneous cushioning of the loading on the drive at the instant of applying power to the motor. Such cushioning limits the level and duration of the surge currents in the motor which occur until the motor shaft begins to rotate. It has been found that the deflection during the initial period of time after application of full voltage will amount to about 20°. However, it has been found that the torsional resiliency of the coupling 80 does not increase the duration of the period required for the door to reach full speed as compared to a rigid coupling and the time for door opening is not increased.

As best shown in FIG. 3, the terminating portions 82a of the convolutions 80 are rigidly connected to shafts 34, 36 respectively through the solid end portions 84 of the coupling 80 and are subjected to greater shear stress than the middle convolutions of the coupling. It is important to provide a means for decreasing the level of the shear stress imposed on the terminating portions 82a in order to prevent their fracture or permanent deformation. As shown in FIG. 3, the slots 83 forming the clearances between the convolutions 82 of the coupling are gradually curved by increasing the helix angle at their ends 83a to gradually increase the cross-section of the convolutions where they join the solid cylindrical end portions 84. As a result, the shear stresses per unit area which would otherwise be imposed on the end portions 82a of the convolutions are reduced. In practice, approximately the final third 82a of each end convolution is gradually enlarged by curving the ends 83a of slot 83 so that the cross-section of the convolution at its point of juncture with the swaged end portions 84 of the coupling is increased about 10 percent or more and preferably about 20 percent.

As will be apparent to persons skilled in the art, various modifications, adaptations and variations of the foregoing specific disclosure can be made without departing from the teachings of the present invention.

I claim:

1. A door operator suited for powering a traffic responsive sliding door suspended by a trolley which rides on a track mounted by a header above the doorway comprising a threadless drive shaft, journal means mounting said shaft for rotation and limited reciprocation in parallel relationship to the track, a reversible drive motor having a shaft coaxially aligned with the drive shaft, a reciprocable carriage mounting rollers engaging the drive shaft, said rollers being skewed relative to the axis of the drive shaft to move the carriage along the shaft as the shaft is rotated, and a coupling having a midsection comprising a plurality of closely spaced helical convolutions with the end portions thereof respectively secured to said motor shaft and said drive shaft, and means for decreasing the shear stresses per unit area imposed on the end portions of said convolutions during the transmission of torque between the motor and the drive shaft.

2. The door operator of claim 1 wherein the spring rate of the coupling in compression is sufficient to prevent the bottoming of the convolutions and the torsional resilience of the coupling limits the instantaneous power transmitted by the coupling upon the energization of the motor by permitting relative angular displacement of the motor shaft relative to the drive shaft.

3. The door operator of claim 1 wherein a connector is provided between the carriage and the trolley, said connector providing for limited relative vertical and lateral movement of the carriage and the trolley to accommodate misalignment between the track and the drive shaft.

* * * * *